United States Patent
Pelissier et al.

(10) Patent No.: US 10,157,066 B2
(45) Date of Patent: Dec. 18, 2018

(54) METHOD FOR OPTIMIZING PERFORMANCE OF COMPUTATIONALLY INTENSIVE APPLICATIONS

(71) Applicant: Cisco Technology, Inc., San Jose, CA (US)

(72) Inventors: Joseph E. Pelissier, Hillsboro, OR (US); Landon Curt Noll, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 175 days.

(21) Appl. No.: 15/202,836

(22) Filed: Jul. 6, 2016

(65) Prior Publication Data
US 2017/0269944 A1  Sep. 21, 2017

Related U.S. Application Data

(60) Provisional application No. 62/310,866, filed on Mar. 21, 2016.

(51) Int. Cl.
*G06F 9/4401* (2018.01)
*H04L 12/24* (2006.01)

(52) U.S. Cl.
CPC ........ *G06F 9/4416* (2013.01); *H04L 41/0823* (2013.01)

(58) Field of Classification Search
CPC .................................................. G06F 9/4416
See application file for complete search history.

(56) References Cited

U.S. PATENT DOCUMENTS

2014/0047084 A1* 2/2014 Breternitz ........... H04L 67/1008
709/221
2015/0286507 A1* 10/2015 Elmroth .............. G06F 11/3442
718/104

OTHER PUBLICATIONS

"CPU Management User and Administrator Guide", Slurm workload manager, Simple Linux Utility for Resource Management, Apr. 15, 2015, 17 pages.
"Moab HPC Suite—Basic Edition 8.1.1 Release Notes", 14 pages.
"Torque Open-Source Resource Manager", Adaptive Computing, Intelligent HPC Workload Management, Jun. 6, 2012, 490-2012-06-06, 1 page.

* cited by examiner

*Primary Examiner* — Kim Huynh
*Assistant Examiner* — Eric Chang
(74) *Attorney, Agent, or Firm* — Edell, Shapiro & Finnan, LLC (57) ABSTRACT

A computing system may be configured to receive a plurality of computing tasks for execution. The computing system may determine a first configuration setting for a first computing task and a second configuration setting, which is different from the first configuration setting, for a second computing task. A first computing node and a second computing node of the computing system may be booted according to the first and second configuration settings, and loaded with the first and second computing tasks for execution, respectively. After the first computing task finishes on the first computing node, the computing system may determine whether another computing task associated with the first configuration setting has not been executed, and when there is no such computing task remaining unexecuted, the computing system may reboot the first computing node according to a third configuration setting and load a third computing task into the first computing node for execution.

20 Claims, 11 Drawing Sheets

METHOD FOR OPTIMIZING PERFORMANCE OF COMPUTATIONALLY INTENSIVE APPLICATIONS

PRIORITY CLAIM

This application claims priority to U.S. Provisional Application No. 62/310,866, filed Mar. 21, 2016, the entirety of which is incorporated herein by reference.

TECHNICAL FIELD

The present disclosure relates to improving computer performance.

BACKGROUND

Computers have been widely used for various tasks, for example, stock trading, video streaming, weather forecasting, even performing nuclear reaction simulation. To improve a computer's performance, over the years, the hardware components have been scaled up, for example, by adding more processors, more memory, more cache, etc. More recently, with the development of cloud-based computing, more robust computing systems have been constructed to support the various computing needs with the state of the art hardware components.

Making better use of a robust computing system to support different computing needs, however, presents a unique challenge. For example, stock trading may need many computing sessions for different traders with each trading session providing fast responses (very sensitive to interruptions), but weather forecasting may need very few computing sessions each with long computing time (not sensitive to interruptions). Existing techniques generally involve the computing system allocating system resources based on what resources are available and any needs identified by computing tasks. For example, after a computing system boots up, it determines how much resources, such as computer processors, cores, threads, sockets, memory, etc., are available, and each computing task may be assigned an amount of computing resource based on whether the computing task needs more processors, cores, threads, and memory.

DESCRIPTION OF EXAMPLE EMBODIMENTS

Overview

Techniques are provided to configure a computing system to execute a plurality of computing tasks. The computing system may receive the plurality of computing tasks and determine a first configuration setting for a first computing task and a second configuration setting for a second computing task. The second configuration task may be different from the first configuration setting. The computing system may boot a first computing node and a second computing node according to the first and second configuration settings, and load them with the first and second computing tasks for execution, respectively. After the first computing task finishes on the first computing node, the computing system may determine whether another computing task associated with the first configuration setting has not be executed, and when there is no such computing task remaining unexecuted, the computing system may reboot the first computing node according to a third configuration setting and load a third computing task into the first computing node for execution.

An embodiment according to the present disclosure may involve scheduling processors to be configured with various normally static processor settings and distribute work loads to processors with the desired settings. In addition, the parameters may be automatically adjusted for various settings to find an optimal setting for a given application. Moreover, while it is common for work schedulers to distribute work loads based on existing processor availability, low-level processor settings may be optimized for groups of computing nodes within a computing system (e.g., a computer cluster) to optimize the computing system for a given set of work requests.

Example Embodiments

The computing resources provided by a computing system may be determined according to its configuration setting. Typical settings may include a number of processors, an amount of memory, cache and power, etc. Traditionally, the settings have been statically configured. For example, a computer manufacturer may provide a default setting that is suitable for the vast majority of compute applications (such as general business, desktop, database, and web serving applications). The default setting is rarely changed. In the few cases in which they are changed, this change is typically performed once (typically as a Basic Input/Output System (BIOS) setting) and it is never changed again. Therefore, when a computing system starts, its configuration is set and it would be very hard to change. Different computing tasks, however, may have different needs for computing resources. For example, research and academic simulations, highly parallel applications, technical computing applications, and balanced computing applications, may have different characteristics such that they are better performed by the same computing system with different configuration settings. In particular, some of the different configuration settings may include non-typical configurations to take advantage of specific features of hardware components for some special needs of a computing task. Embodiments of the present disclosure provide dynamic configuration adjustment to take advantage of the state of the art hardware components.

In an embodiment, a multi-core compute node of a computing system may be scheduled to execute a variety of different computationally intensive applications. The traditional approach is to pick a single static setting that seems best for the most computationally intensive applications. This one setting for all cores, however, may become sub-optimal when a different mix of computation is scheduled. Sometimes the performance may suffer more when two different applications' CPU core subnet setting requirements are incompatible. According to one embodiment, a computing system may provide assistance in determining the optimum configuration for a given application and dynamically configure configuration setting parameters for, for example, BIOS and/or other lower-level processor settings.

Figure 1:
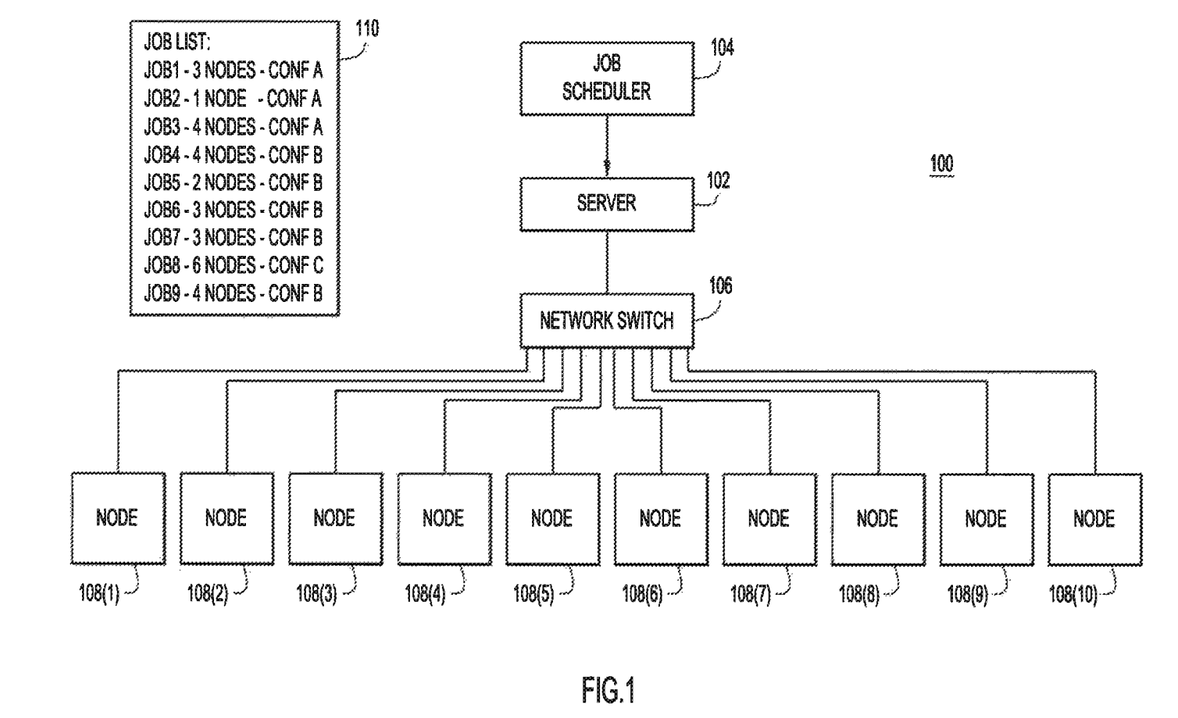
FIG. 1 illustrates a computing system in which a plurality of computing tasks may be allocated to a plurality of computing nodes, according to an example embodiment.

With reference to FIG. 1 there is shown an example computing system 100 in which dynamic configuration setting adjustment techniques may be implemented. The computing system 100 may comprise a server 102, a network switch 106, and a plurality of computing nodes 108(1) through 108(10). The server 102 may execute a job scheduler 104 to schedule a plurality of computing tasks for execution. The computing tasks may be represented as a plurality of computing jobs in a job list 110. In one embodiment, the computing system 100 may be a server farm or server cluster at a data center.

It should be noted that although the server 102 is labeled as a server, it may be just another computing node in addition to the plurality of computing nodes 108(1)-108(10). For example, the server 102 may be instantiated as a computing node with the label 108(11) (thought not shown as such in FIG. 1). In one embodiment, the server 102 may be a designated server machine in the computing system 100 to execute the job scheduler 104. In another embodiment, the server 102 may be another regular computing node that happens to be tasked to execute the job scheduler 104. Moreover, in yet another embodiment, the job scheduler 104 may be distributed among more than one computer of a computing system (e.g., two or more computing nodes).

Further, it should be noted that although the computing nodes of the computing system 100 may be connected in a network shown in a star topology, embodiments of the computing system 100 may be implemented in any kind of network topology, such as, but not limited to, star, ring, bus, mesh, tree, etc. Therefore, the network switch 106 may be optional and not present in one embodiment but a plurality of network switches 106 may be used in different embodiment. For example, in some embodiments, the server 102 may implement a plurality of network interfaces to be connected with the plurality of computing nodes 108, or alternatively, the computing nodes of the computing system 100 may be connected in a ring or bus, such that the network switch 106 may not be needed.

The computing tasks to be executed by the computing system 100 may need different computing resources for execution. These computing resources may be optimally provided by different configuration settings. As shown in FIG. 1, in the job list 110, a computing task identified as Job1 may need three computing nodes with configuration A, a computing task identified as Job2 may need one computing node with configuration A, a computing task identified as Job3 may need four computing nodes with configuration A, a computing task identified as Job4 may need four computing nodes with configuration B, a computing task identified as Job5 may need two computing nodes with configuration B, a computing task identified as Job6 may need three computing nodes with configuration B, a computing task identified as Job7 may need three computing nodes with configuration B, a computing task identified as Job8 may need six computing nodes with configuration C, a computing task identified as Job9 may need four computing nodes with configuration B. These computing tasks and the plurality of computing nodes 108(1)-108(1), however, are just one example. In one embodiment, the computing system 100 may comprise hundreds, thousands or tens of thousands of computing nodes and the computing tasks may include hundreds, thousands or tens of thousands of computing jobs. Moreover, both the number of computing nodes and the computing tasks may be changed during operation of computing system 100. For example, one or more existing computing nodes may be taken offline for maintenance and/or upgrade and new computing nodes may be added. Also, one or more existing computing tasks may be canceled before being executed and/or new computing tasks may be added.

Figure 2:
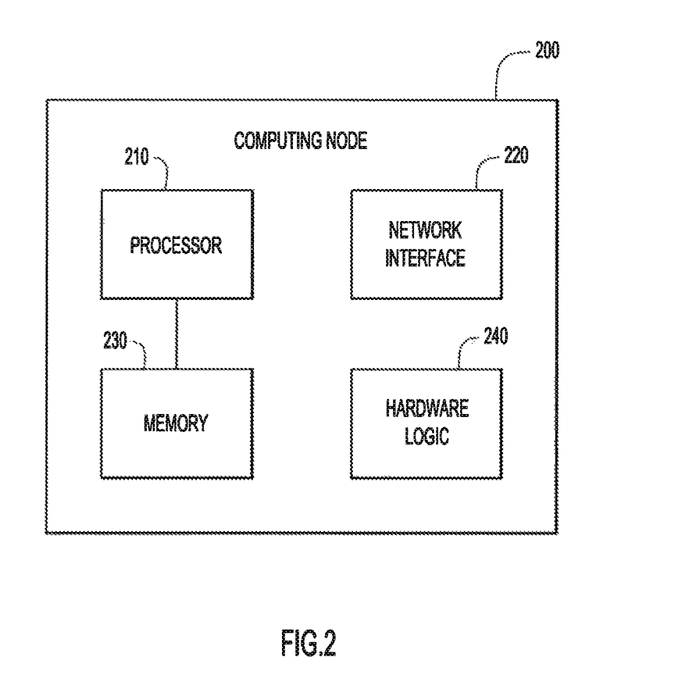
FIG. 2 is an illustration of an example computing node, according to an example embodiment.

With reference to FIG. 2, there is an illustration of an example computing node 200. The example computing node 200 may be a representative of any of the computing nodes 108 and may comprise a processor 210 (e.g., a Central Processing Unit (CPU)), a network interface unit 220, a memory 230 and hardware logic 240. During execution, the memory 230 may be loaded with a computing task assigned to the computing node 200, which may be a full job (e.g., Job2 if the computing node 200 is configured according to Configuration A) or a portion of a job (e.g., part of Job1 if the computing node 200 is configured according to Configuration A or part of Job4 if the computing node 200 is configured according to Configuration B). It should be noted that, in some embodiments, some portion of a computing task assigned to the computing node 200 may be performed by the hardware logic 240, or be performed in a combination of both hardware and software.

The processor 210 is, for example, a microprocessor, a microcontroller, systems on a chip (SOCs), or other fixed or programmable logic. The memory 230 may include read only memory (ROM), random access memory (RAM), magnetic disk storage media devices, optical storage media devices, flash memory devices, electrical, optical, or other physical/tangible memory storage devices. The memory 230 may be separate or part of the processor 210. Thus, in general, during execution, the memory 230 may comprise one or more tangible (e.g., non-transitory) computer readable storage media (e.g., a memory device) encoded with software comprising computer executable instructions and when the software is executed (by the processor 210) it is operable to perform the operations to complete any assigned computing tasks.

The network interface unit 220 enables communication over with other computing nodes in a computing system. As such, the network interface unit 220 may be a network interface card that includes a plurality of communication ports configured to receive/send data from/to the network connecting with other computing nodes. The plurality of communication ports may include wired and/or wireless ports, which may be serial or parallel ports. The computing node 200 may include a plurality of network interface cards.

The functions of the processor 210 may be implemented by a processor or computer readable tangible non-transitory medium encoded with instructions or by logic encoded in one or more circuits (e.g., embedded logic such as an application specific integrated circuit (ASIC), digital signal processor (DSP) instructions, software that is executed by a processor, etc.), wherein the memory 230 stores data used for the computations or functions described herein (and/or to store software or processor instructions that are executed to carry out the computations or functions described herein). Thus, operations for any assigned computing tasks may be implemented with fixed logic or programmable logic (e.g., software or computer instructions executed by a processor or field programmable gate array (FPGA)).

Hardware logic 240 may be used to facilitate the operations of the computing node 200. It may be coupled to the processor 210 or be implemented as part of processor 210. In some embodiments, the hardware logic 240 may also include one or more application specific integrated circuits that include buffers, queues, and other control logic for performing operations.

It should be appreciated that in other embodiments, the computing node 200 may include fewer or more components apart from those shown in FIG. 2, such as a bus, memory interface logic, etc. Regardless what components are included in the computing node 200, each of these components may include a group of low-level parameters that may be set according to different computing needs and different properties of the hardware components. For example, the processor 210 may have configurable low-level parameters controlling the processor 210's operation performance such as, but not limited to, one or more of CPU halt states, CPU hyper threading, core multiprocessing, cache pre-fetchers, performance boost, dynamic frequency scaling, Data Direct I/O and Direct Cache Access, power control, etc. The memory 230 may have configuration parameters controlling operation performance of the memory such as, but not limited to, one or more of low voltage mode of Double Data Rate (DDR) memory, and Isochronous mode. The network interface unit 220 and the hardware logic 240 may also have configurable low-level parameters controlling their respective operation performance.

In some embodiments, the set of configurable low-level parameters supported by a hardware component may be different for different models of the hardware component. For example, if the processor 210 is a later model CPU, it may have hardware support for hyper threading and may have configurable low-level parameters to enable, disable or control the hyper threading. Also, if the processor 210 is a multi-core processor, the processor 210 may have configurable low-level parameters to configure the multi-core processor for different computing tasks. Different models of memory 230, network interface 220 and hardware logic 240 may also have different set of configuration parameters as well.

It should be noted that the above example configurable low-level parameters are not exhaustive and it is likely that parameters will be added and deleted as technology evolves. In addition, the relative affect of adjusting these parameters may vary between hardware component families. Moreover, these settings may have unique characteristics compared to those normally recognized by conventional work load schedulers. For example, the settings that are recognized by conventional workload schedulers tend to be static settings (e.g. installed memory, number and type of CPU cores, etc.) that cannot be changed by the conventional workload scheduler and dynamic settings (e.g. memory allocated to a particular application, network connectivity, etc.) that the conventional workload scheduler may affect only on a per application basis. In contrast, the techniques for dynamic configuration adjustment according to embodiments of the present disclosure may adjust settings that are quasi-static. That is, these settings can be set and administered by a workload manager, but changing the settings may be highly disruptive (often times requiring a reboot of the machine and affecting all processes on that machine). Therefore, one advantage of the embodiments may be the ability to plan and schedule workloads based on parameters that can be changed, albeit relatively infrequently.

There are certain key application areas in which making non-typical settings of these parameters can yield significant performance improvements. For example, some computer processors have a setting that attempt to pre-fetch additional instructions and data into cache memory. In typical applications, this provides a performance increase due to the fact that data needed for a particular operation is often located near data that has already been fetched. However, some technical computing applications do not exhibit this data locality. In this case, the non-typical setting of not pre-fetching data for the cache can improve performance by decreasing the amount of useful data being swapped out of cache for data that will not be used.

In general, the settings of any parameters on a given processor may affect all cores on the processor. Some of the parameters may be changed while the processor is operating but the change will affect all applications running on that processor. Therefore, in some embodiments, it is not practical to change these parameters at the operating system task scheduling interval. In addition, some parameters may only be set at system boot.

Computation intensive applications are often scheduled across processors using a conventional work scheduler. These schedulers consider individual application requirements, such as priority, memory, number of processors, etc., and the resources available in the compute cluster. With this information, the conventional work scheduler attempts to optimize the distribution of work across a computing system, such as a data center. However, these conventional work schedulers do not consider the possibility of adjusting the semi-static processor configurations described above in the optimization of the use of the computing resources.

Each different configuration settings (e.g., Configuration A, Configuration B and Configuration C) for the computing node 200 (e.g., a computing node 108) may include specific values (or range of values) for one or more the configurable low-level parameters for one or more hardware components of the computing node 200. Dynamic configuration setting adjustment techniques for the computing system 100 will be described in connection with FIGS. 3-9.

Figure 3:
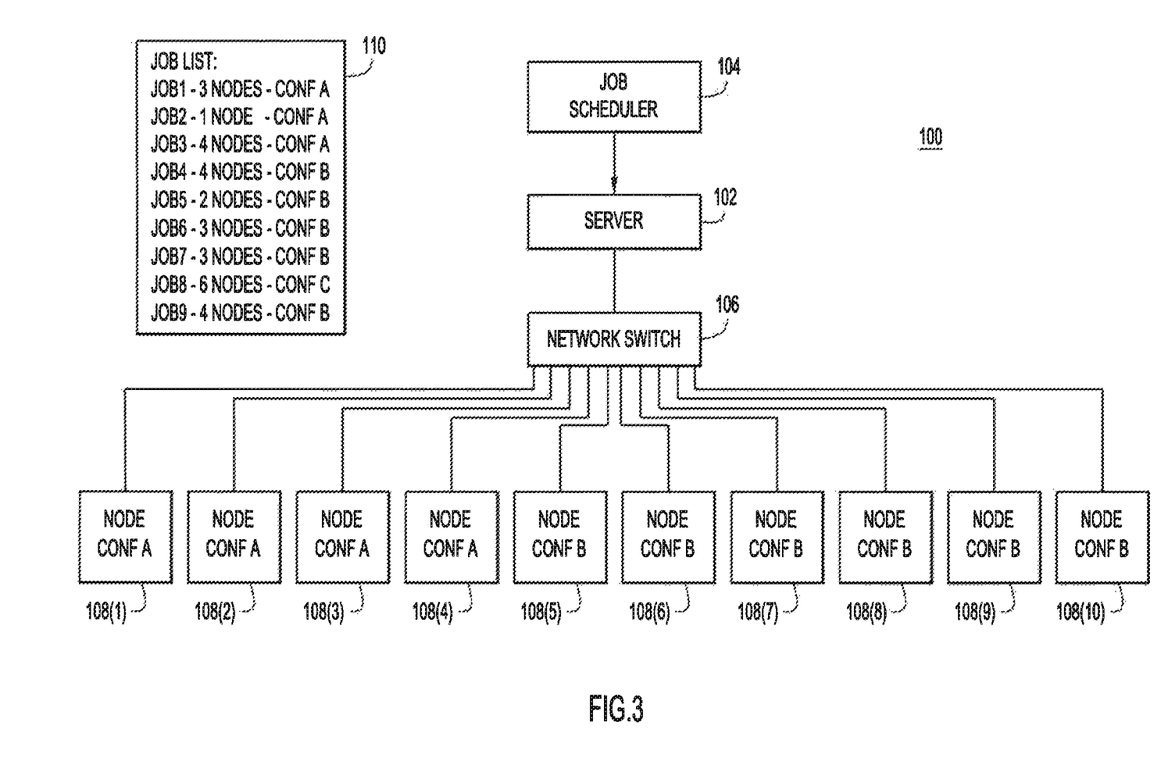
FIG. 3 is an illustration of an initial configuration of the computing system of FIG. 1, according to an example embodiment.

With reference to FIG. 3, there is an illustration of an initial configuration of the computing system 100. As shown in FIG. 3, the computing nodes 108(1)-108(4) may be booted according to Configuration A, and the computing nodes 108(5)-108(10) may be booted according to Configuration B. The computing system 100 may begin execution of the computing tasks by examining the computing tasks (e.g., the job list 110) and setting the configurations in each computing nodes to optimize the overall system configuration for the list of jobs need to be executed. In an embodiment, the job scheduler 104 may perform such examination of the computing tasks and configuration settings before any computing nodes being booted up to avoid rebooting any computing nodes. In another embodiment, if the computing nodes have already been booted up, the job scheduler 104 may schedule computing tasks that match the current configuration settings as much as possible to minimize rebooting any computing nodes. Therefore, the job scheduler 104 may attempt to configure the computing nodes in such a manner that several jobs may execute before making further changes to the configuration of any computing nodes. It should be noted that configuration of a computing node may refer to a specific collective setting of all the configurable low-level parameters of all hardware components of the computing node, and the configuration of a computing system may refer to a specific collective setting of the configuration of all computing nodes in the computing system.

Figure 4:
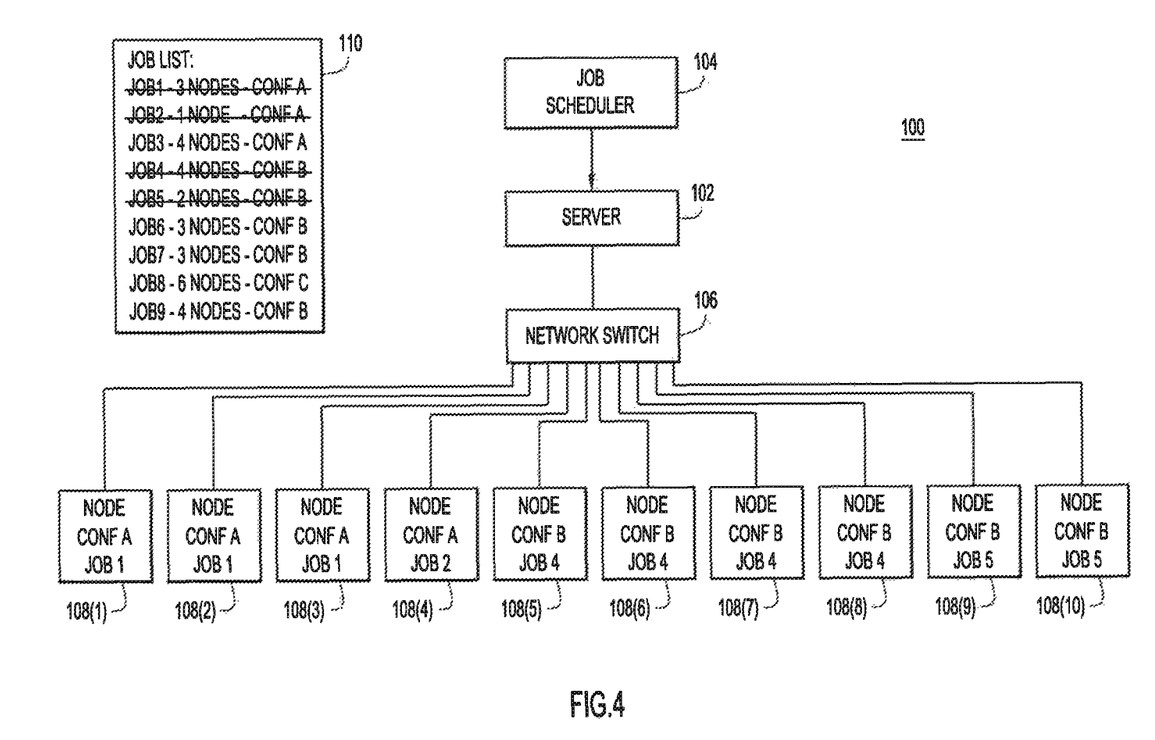
FIG. 4 illustrates an initial allocation of computing tasks in the initial configuration of the computing system of FIG. 3, according to an example embodiment.

With reference to FIG. 4, there is an illustration of an initial allocation of computing tasks in the initial configuration of the computing system 100. According to the job list 110, the computing tasks Job1, Job2 and Job3 may be optimally performed on computing nodes with Configuration A and the computing tasks Job4, Job5, Job6, Job7 and Job9 may be optimally performed on computing nodes with Configuration B. In the initial configuration of the computing system 100, only four computing nodes have Configuration A and six computing nodes have Configuration B, thus the computing tasks exceed the capacity of the computing system 100. In this situation, the job scheduler 104 may attempt to order and assign the computing tasks to best utilize the computing system 100. As shown in FIG. 4, the computing task Job1 may be assigned to the computing nodes 108(1)-108(3), the computing task Job2 may be assigned to the computing node 108(4), the computing task Job4 may be assigned to the computing nodes 108(5)-108(8), and the computing task Job5 may be assigned to the computing nodes 108(9)-108(10). Each assigned computing task may be marked as crossed out in the job list 110.

Figure 5:
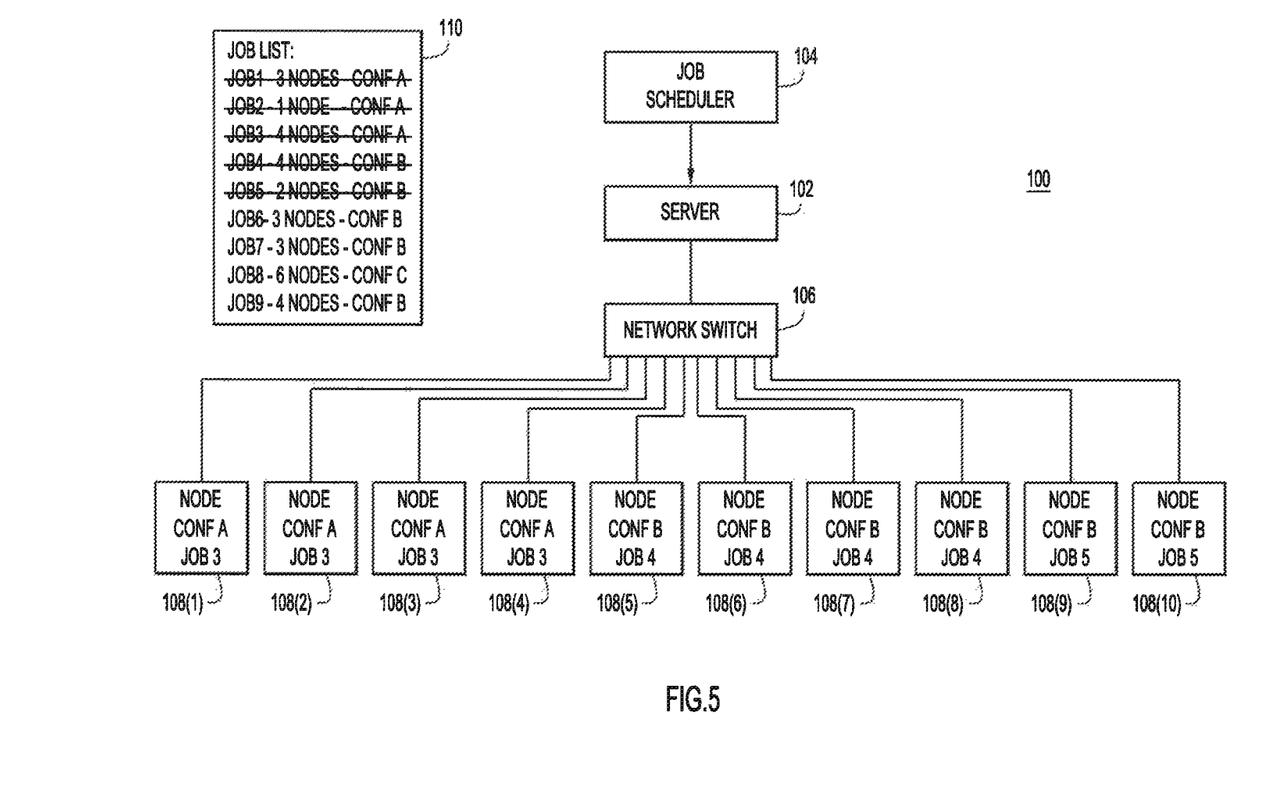
FIG. 5 illustrates further allocation of computing tasks in the initial configuration of the computing system of FIG. 3, according to an example embodiment.

With reference to FIG. 5, there is an illustration of further allocation of computing tasks in the initial configuration of the computing system 100. After the computing tasks Job1 and Job2 have completed, the job scheduler 104 may assign the computing task Job3 to the computing nodes 108(1)-108(4) and execute the computing task Job3 on the computing nodes 108(1)-108(4). The computing task Job4 may be continuously executed on the computing nodes 108(5)-108(8), and the computing task Job5 may be continuously executed on the computing nodes 108(9)-108(10).

Figure 6:
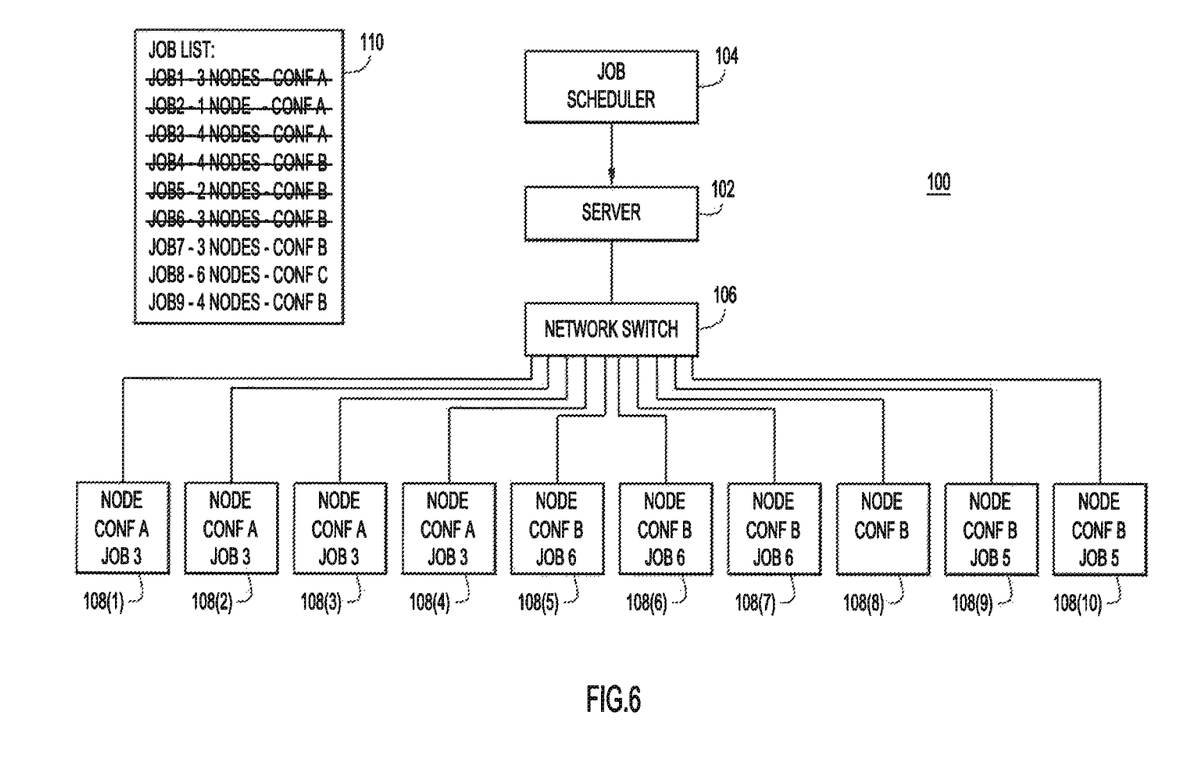
FIG. 6 illustrates further adjustment of allocation of computing tasks in the initial configuration of the computing system of FIG. 3, according to an example embodiment.

With reference to FIG. 6, there is an illustration of further adjustment of allocation of computing tasks in the initial configuration of the computing system 100. After the computing task Job4 has completed, the job scheduler 104 may assign the computing task Job6 to the computing nodes 108(5)-108(7). The computing task Job3 may be continuously executed on the computing nodes 108(1)-108(4), and the computing task Job5 may be continuously executed on the computing nodes 108(9) and 108(10). It should be noted that the computing node 108(8) may be left unutilized because there is no remaining unexecuted computing task that can be fit into the computing node 108(8). Further, embodiments of the dynamic configuration setting adjustment techniques may evaluate the remaining computing tasks before deciding to reboot any computing node to change its configuration. For example, in the situation at FIG. 6, although there is no computing task being executed by the computing node 108(8), the job scheduler 104 may determine it is better to keep the computing node 108(8) in Configuration B then to rebooting the computing node 108(8) to change its configuration.

Figure 7:
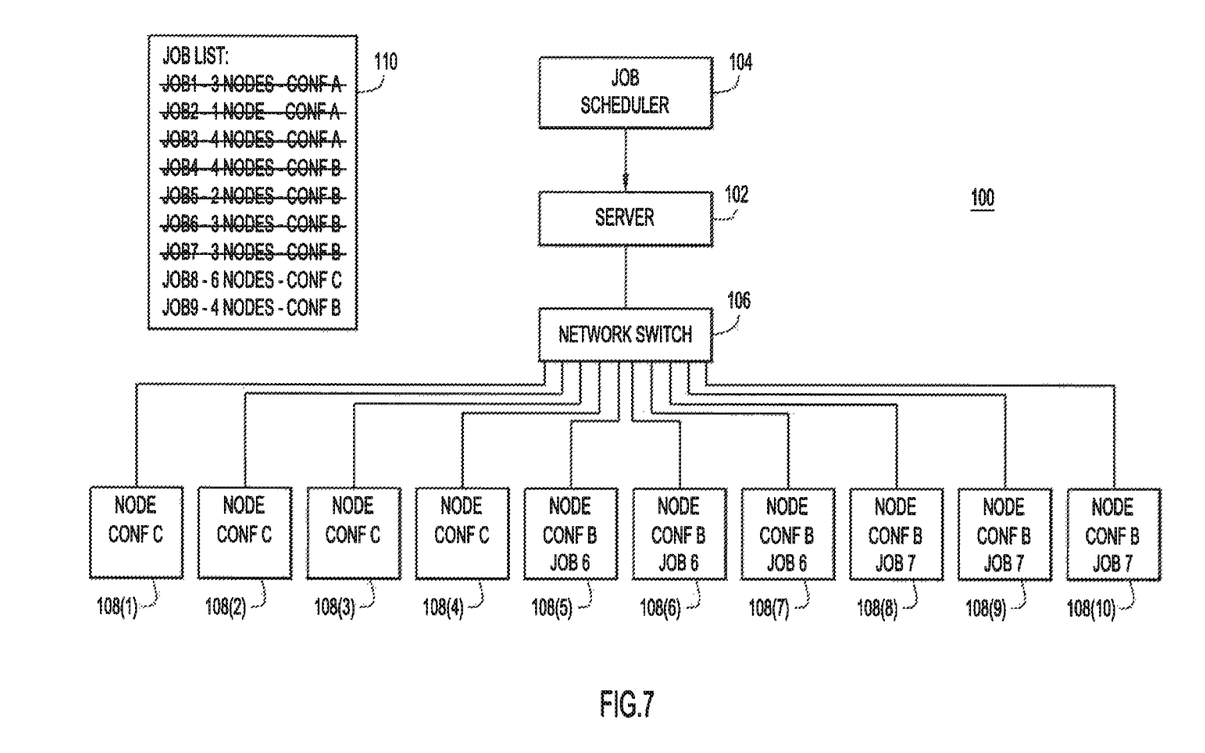
FIG. 7 illustrates an adjustment to the initial configuration of the computing system of FIG. 1, according to an example embodiment.

With reference to FIG. 7, there is an illustration of an adjustment to the initial configuration of the computing system 100. At this point Job3 and Job5 may have completed. In addition to the computing node 108(8), now the computing nodes 108(1)-108(4), 108(9), and 108(10) may become available. Therefore, the job scheduler 104 may start Job7 on the computing nodes 108(8)-108(10). Also, the job scheduler 104 may determine that it is time to obtain a new configuration of Configuration C in six (6) computing nodes to support the computing task Job8. Thus, the job scheduler 104 may reconfigure the computing nodes 108(1)-108(4) that were running the computing task Job3. After rebooting with Configuration C, the computing nodes 108(1)-108(4) may remain idle until two more computing nodes become available.

Figure 8:
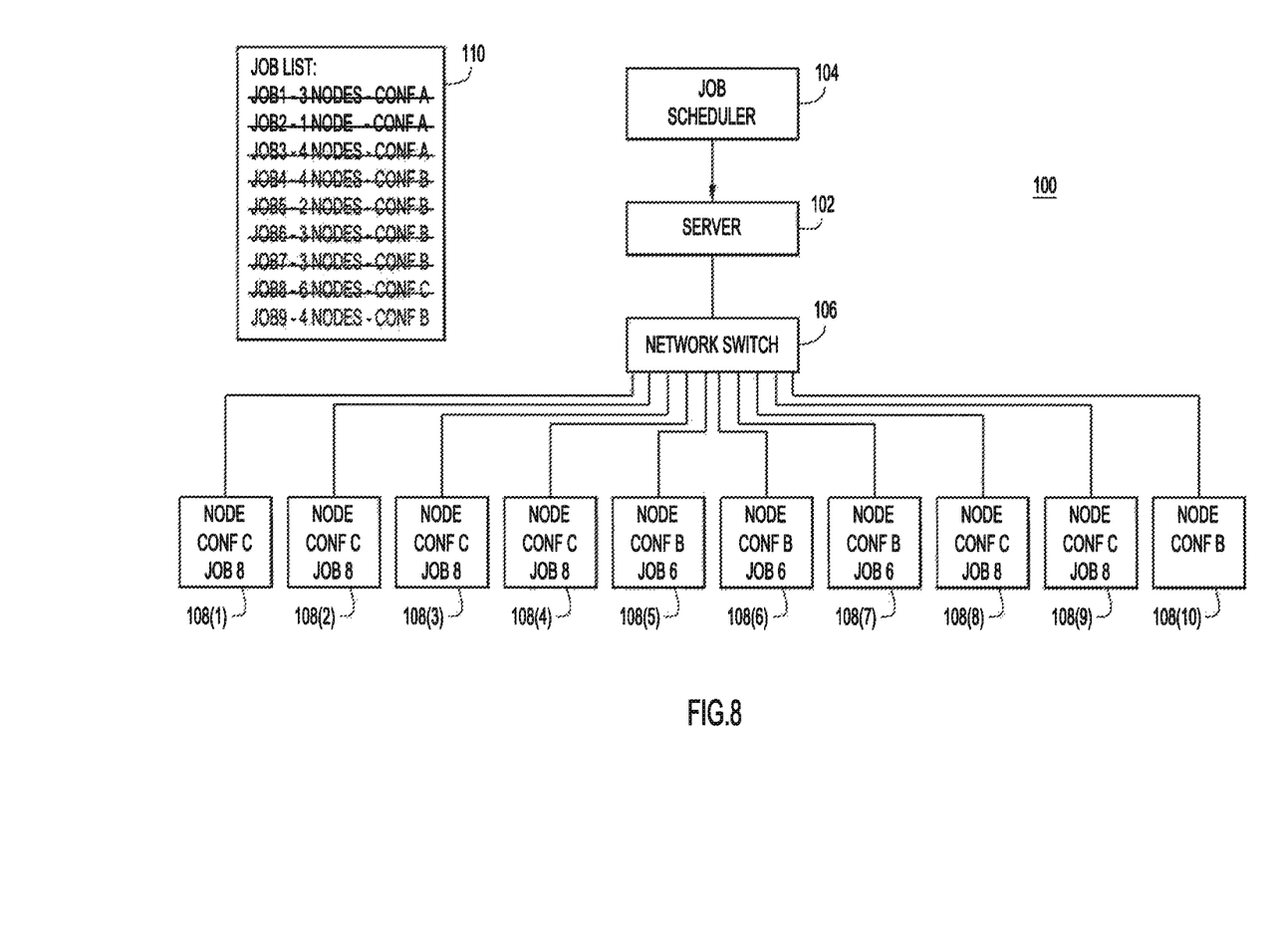
FIG. 8 illustrates further adjustment to the configuration and allocation of computing tasks of the computing system of FIG. 7, according to an example embodiment.

With reference to FIG. 8, there is an illustration of further adjustment to the configuration and allocation of computing tasks of the computing system 100. At this point Job7 may have completed and the computing nodes 108(8)-108(10) may become available. The job scheduler may determine that it is time to obtain a new configuration of Configuration C in two more computing nodes and thus may reconfigure the computing nodes 108(8) and 108(9). After rebooting with Configuration C, the computing nodes 108(8) and 108(9), as well as the computing nodes 108(1)-108(4), may be assigned the computing task Job8.

Figure 9:
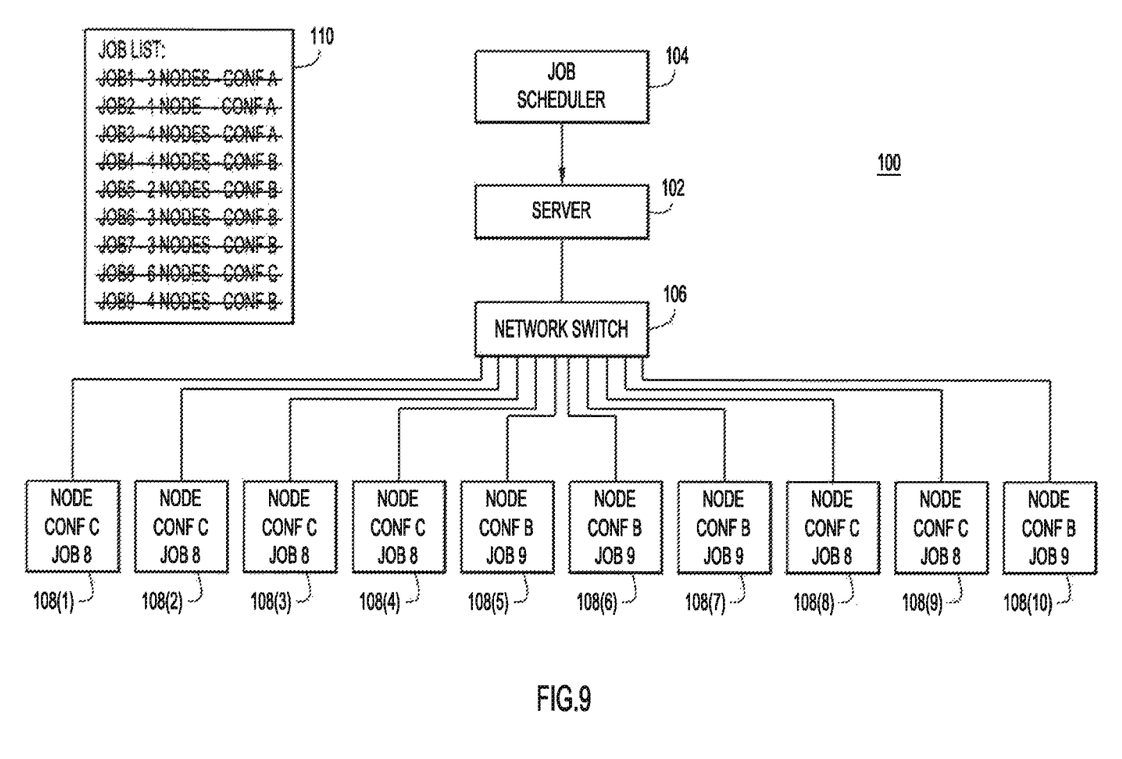
FIG. 9 illustrates further adjustment to allocation of computing tasks of the computing system of FIG. 8, according to an example embodiment.

With reference to FIG. 9, there is an illustration of further adjustment to allocation of computing tasks of the computing system 100. At this point, the computing task Job6 may have completed and Job9 may be loaded into the computing nodes 108(5)-108(7) and 108(10) and executed on these computing nodes.

As described above, the job scheduler 104 may be configured to attempt to minimize the number of configuration changes by optimizing the order in which the computing tasks are executed. This is different from conventional job scheduling schemes, which attempt to modify configuration parameters that can be changed nearly instantaneously and does not minimize changes. Moreover, embodiments of the present disclosure may extend the configuration ability to parameters that require significant time to change (such as those that require a reboot of the computing nodes) and thus may implement techniques to minimize such changes. Also, while not illustrated, the job list 110 may change as new computing tasks are added. Therefore, changes to the order in which computing nodes are configured and computing tasks are assigned and executed may also occur over time.

Figure 10:
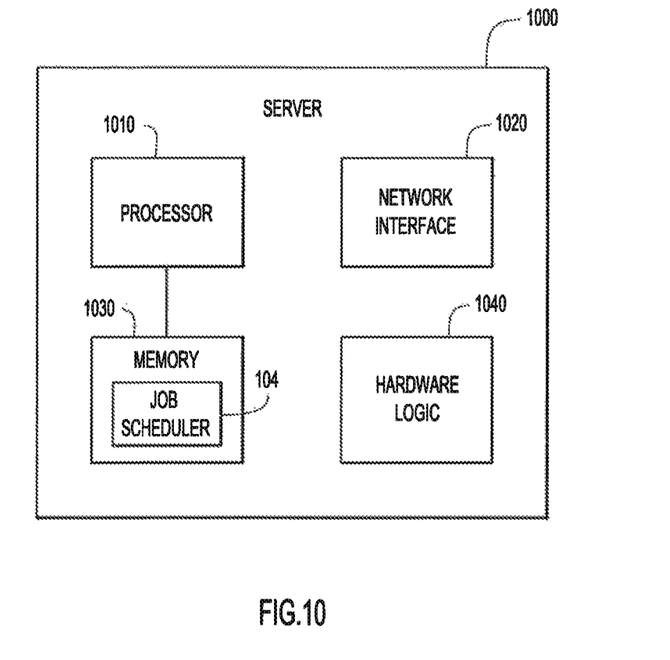
FIG. 10 illustrates is an illustration of an example computer server, according to an example embodiment.

With reference to FIG. 10, there is an illustration of an example architecture of a server 1000 configured to execute the job scheduler 104. The server 1000 may be another computing node in the computing system 100 and designated to be the server 102. The server 1000 may comprise a data processing device 1010, one or more network interface units 1020, a memory 1030 and hardware logic 1040. Resident in the memory 1030 is software for the job scheduler 104, which may include operational processes regarding dynamically adjust configuration setting for computing tasks as described above, and is further described below in connection with FIG. 11. The data processing device 1010 may be similar to the data processing device 210 shown in FIG. 2. The memory 1030 may be similar to the memory 230. Instructions for performing the job scheduler 104 may be stored in the memory 1030 for execution by the processor 1010 such that when executed by the processor, causes the processor to perform the operations describe herein in connection with FIGS. 3-9 and 11. The job scheduler 104 may also be implemented in hardware using hardware logic 1040 (e.g., ASIC or FPGA), or be implemented in a combination of both hardware and software. The network interfaces 1020 may comprise network ports that can send and receive data (e.g., packets) in a network, and thereby enable the computing nodes to communicate with the server over a network as shown in FIGS. 1 and 3-9.

Figure 11:
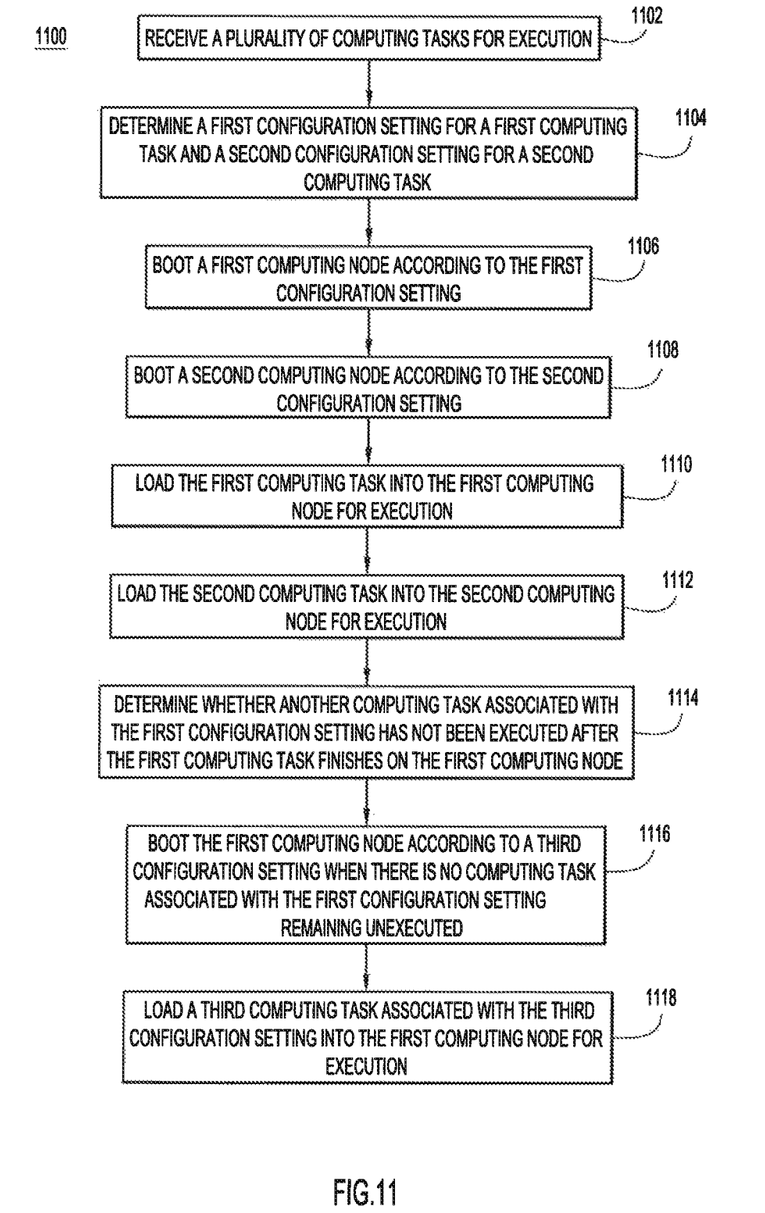
FIG. 11 illustrates a flowchart to allocate a plurality of computing tasks to a plurality of computing nodes, according to an example embodiment.

Referring to FIG. 11, a flowchart of an example method 1100 is shown that generally depicts the operations of the job scheduler 104 to support dynamic configuration setting adjustment according to the techniques described herein. Method 1100 may be performed by the server 102 in the computing system 100. At 1102, a plurality of computing tasks may be received for execution. For example, the computing system 100 may receive the computing tasks, which may be represented as jobs the job list 110 as shown in FIGS. 1 and 3-9. At 1104, a first configuration setting for a first computing task and a second configuration setting for a second computing task may be determined. The first configuration setting may differ from the second configuration setting.

Depending on the nature of each computing task, for example, whether it may be a research and academic simulation, highly parallel application, technical computing application, or balanced computing application, a configuration setting to take advantage of the hardware components' capability may be determined. As described above, the hardware components of each computing node may have configurable low-level parameters that may configure the hardware component to provide optimal performance according to the nature of the computing task. For example, Configuration A may be determined for the computing tasks represented as Job1, Job2 and Job3, Configuration B may be determined for the computing tasks represented as Job4, Job5, Job, 6 and Job 9, and Configuration C may be determined for the computing task represented as Job8.

In some embodiments, a computing task may carry with it recommended configuration settings for its performance. For example, an administrator or a computer programmer may create a configuration setting file that may be attached to the computing task. The method 1100 may adopt the configuration settings in the configuration setting file or adjust the configuration settings according to available hardware components in the computing system 100.

Moreover, in some embodiments, the first configuration setting and the second configuration setting may be determined by test executing a portion of the first computing task and a portion of the second computing task using different configuration settings. For example, the job scheduler 104 may test execute a port of one or more computing tasks using a variety of configuration settings and determine a configuration setting for each of the one or more computing tasks with the best performance by comparing the performance under the different configuration settings. In an embodiment, this process may be performed automatically to cycle through different settings to find the most optimal setting for a given computing task.

In addition, in some embodiments, the first configuration setting and the second configuration setting may be determined by executing, by simulation, a portion of the first computing task and a portion of the second computing task using different configuration settings, and the first configuration setting and the second configuration setting may be determined based on simulation performance under the different configuration settings.

At 1106, a first computing node may be booted according to the first configuration setting and at 1108 a second computing node may be booted according to the second configuration setting. At 1110, the first computing task may be loaded into the first computing node and at 1112 the second computing task may be loaded into the second computing node. In some embodiments, a computing task may need several computing nodes to execute. For example, the computing task Job1 may need 3 computing nodes to execute and thus it may be loaded into the computing nodes 108(1)-108(3) and each computing nodes may execute a portion of the Job1.

At 1114, after the first computing task finishes on the first computing node, whether another computing task associated with the first configuration setting has not be executed may be determined. For example, after the computing task Job1 finishes on the computing node 108(1), the method 1100 may determine whether another computing task associated with Configuration A has not been executed, or after the computing task Job4 finishes on the computing node 108(8), the method 1100 may determine whether another computing task associated with Configuration B has not been executed.

At 1116, when there is no computing task associated with the first configuration setting remaining unexecuted, the first computing node may be rebooted according to a third configuration setting different from the first configuration setting, and at 1118, a third computing task of the plurality of computing tasks associated with the third configuration setting may be loaded into the first computing node for execution.

In summary, techniques presented herein provide enhancements to conventional work schedulers to enable the schedulers to better optimize high-performance work loads across a cluster of computers. The enhancements include, but not limited to, adjustably configuring the BIOS and other low-level processor settings on individual processors within a computing system, incorporating a computing task's need for configurable low-level settings, taking into account the default settings for a computing system, configuring different BIOS and other low-level processor settings on individual processors or groups of processors within a computing system to best meet the needs of the work requests being scheduled, and automatically cycling through different settings to find the most optimal settings for a given work request. In some embodiments, a configurable low-level setting for a hardware component may include a description of whether the setting is must have, desired, undesired, or must not have, or don't care. In addition, the default settings for a computing system may also include for each setting a description of whether the setting is must have, desired, undesired, or must not have, or don't care.

Exemplary implementations of the embodiments may support distributing typical high performance compute applications among many computing nodes (e.g., computer machines). These applications tend to cycle between a compute phase and a communication phase. It may be observed that applications that have a relatively short compute phase and long communication phase may be negatively impacted by power management. For example, during the communication phase and the offload provided by user-space network interface card (NIC), the processors tend to go into a low power mode. Then, when the compute phase starts up again, there is a long delay for the processors to achieve their maximum compute ability. Therefore, in applications that have long compute and short communication phases, the processors of an embodiment may be configured never going into a low power state and the applications are not impacted. But in applications that have long compute and long communication phases, the processors of an embodiment may be configured to go into a low power state during the communication phase. Due to the long compute phase, however, the impact of the transition from low power to high performance is amortized over a much greater number of CPU cycles and is therefore less of an overall impact.

Embodiments according to the present disclosure may also maintain computing nodes with such varying settings so that work loads may be distributed to computing nodes with the appropriate low level settings, and infrequently adjust these settings to adapt to new workloads. Therefore, another aspect of the embodiments is assistance in determining the optimum configuration of these low level settings. For many of these settings, the only reasonable way to determine the optimum settings is trial and error. Therefore, various embodiments may include the ability to run an application multiple times with different settings to determine the optimum configuration for production use.

Moreover, in contrast to existing solutions that distribute workload based on physical constraints such as processor speed, memory capacity, network connectivity, and storage capacity, an embodiment according to the present disclosure may extend this capability to configure low-level processor settings that may be changed only infrequently and include consideration of these settings into the workload distribution system. Embodiments according to the present disclosure may overcome the deficiencies in the conventional work scheduler based on the static configuration because there are a group of applications for which a "one size fits all" configuration of low-level processor settings results in substantially sub-optimal performance.

In summary, in one form, a computer-implemented method is provided comprising: receiving a plurality of computing tasks for execution by a computing system; determining a first configuration setting for a first computing task of a plurality of computing tasks and a second configuration setting for a second computing task of the plurality of computing tasks, wherein the first configuration setting differs from the second configuration setting; booting a first computing node of the computing system according to the first configuration setting; booting a second computing node of the computing system according to the second configurations setting, wherein the first computing node and the second computing node are connected via a network; loading the first computing task into the first computing node for execution; loading the second computing task into the second computing node for execution; after the first computing task finishes on the first computing node, determining whether another computing task associated with the first configuration setting has not be executed; when there is no computing task associated with the first configuration setting remaining unexecuted, rebooting the first computing node according to a third configuration setting different from the first configuration setting; and loading a third computing task of the plurality of computing tasks associated with the third configuration setting into the first computing node for execution.

In summary, in another form, a computing system is provided comprising a plurality of computing nodes connected via a network, at least one of the computing nodes comprising at least a network interface and a processor. The processor may be configured to receive a plurality of computing tasks for execution by the computing system; determine a first configuration setting for a first computing task of a plurality of computing tasks and a second configuration setting for a second computing task of the plurality of computing tasks, wherein the first configuration setting differs from the second configuration setting; boot a first computing node of the computing system according to the first configuration setting; boot a second computing node of the computing system according to the second configurations setting, wherein the first computing node and the second computing node are connected via a network; load the first computing task into the first computing node for execution; load the second computing task into the second computing node for execution; after the first computing task finishes on the first computing node, determine whether another computing task associated with the first configuration setting has not be executed; when there is no computing task associated with the first configuration setting remaining unexecuted, reboot the first computing node according to a third configuration setting different from the first configuration setting; and load a third computing task of the plurality of computing tasks associated with the third configuration setting into the first computing node for execution.

In summary, in yet another form, a non-transitory computer readable storage media stores instructions that, when executed by a processor of a computing device of a computing system, cause the processor to: receive a plurality of computing tasks for execution by a computing system; determine a first configuration setting for a first computing task of a plurality of computing tasks and a second configuration setting for a second computing task of the plurality of computing tasks, wherein the first configuration setting differs from the second configuration setting; boot a first computing node of the computing system according to the first configuration setting; boot a second computing node of the computing system according to the second configurations setting, wherein the first computing node and the second computing nodes are connected via a network; load the first computing task into the first computing node for execution; load the second computing task into the second computing node for execution; after the first computing task finishes on the first computing node, determine whether another computing task associated with the first configuration setting has not be executed; when there is no computing task associated with the first configuration setting remaining unexecuted, reboot the first computing node according to a third configuration setting different from the first configuration setting; and load a third computing task of the plurality of computing tasks associated with the third configuration setting into the first computing node for execution.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:
1. A computer-implemented method comprising:
receiving a plurality of computing tasks for execution by a computing system;
determining a first configuration setting for a first computing task of a plurality of computing tasks and a second configuration setting for a second computing task of the plurality of computing tasks, wherein the first configuration setting differs from the second configuration setting;
booting a first computing node of the computing system according to the first configuration setting;

booting a second computing node of the computing system according to the second configurations setting, wherein the first computing node and the second computing node are connected via a network;

loading the first computing task into the first computing node for execution;

loading the second computing task into the second computing node for execution;

after the first computing task finishes on the first computing node, determining whether another computing task associated with the first configuration setting has not been executed;

when it is determined that a third computing task associated with the first configuration setting has not been executed, loading the third computing task into the first computing node for execution;

when there is no computing task associated with the first configuration setting remaining unexecuted, rebooting the first computing node according to a third configuration setting different from the first configuration setting; and loading a fourth computing task of the plurality of computing tasks associated with the third configuration setting into the first computing node for execution.

2. The method of claim 1, wherein determining the first configuration setting and the second configuration setting comprises test executing a portion of the first computing task and a portion of the second computing task using different configuration settings to determine the first configuration setting and the second configuration setting based on performance under the different configuration settings.

3. The method of claim 1, wherein determining the first configuration setting and the second configuration setting comprises executing, by simulation, a portion of the first computing task and a portion of the second computing task using different configuration settings to determine the first configuration setting and the second configuration setting based on performance under the different configuration settings.

4. The method of claim 1, wherein each of the first configuration setting and the second configuration settings includes one or more low level hardware settings that require a central processing unit (CPU) reboot to take effect.

5. The method of claim 4, wherein the one or more low level hardware settings include CPU settings and memory settings.

6. The method of claim 5, wherein the CPU settings include one or more of CPU halt states, CPU hyper threading, core multiprocessing, cache pre-fetchers, performance boost, dynamic frequency scaling, Data Direct I/O and Direct Cache Access, and power control, and wherein the memory settings include one or more of low voltage mode of Double Data Rate (DDR) memory, and Isochronous mode.

7. The method of claim 1, further comprising:
booting a first subset of a plurality of computing nodes of the computing system including the first computing node according to the first configuration setting, and
loading the first computing task into the first subset of computing nodes for execution.

8. The method of claim 7, further comprising:
booting a second subset of the plurality of computing nodes including the second computing node according to the second configuration setting, and
loading the second computing task into the second subset of computing nodes for execution.

9. A computing system comprising:
a plurality of computing nodes connected via a network, at least one of the computing node comprising at least a network interface and a processor, the processor configured to:
receive a plurality of computing tasks for execution by the computing system;
determine a first configuration setting for a first computing task of a plurality of computing tasks and a second configuration setting for a second computing task of the plurality of computing tasks, wherein the first configuration setting differs from the second configuration setting;
boot a first computing node of the computing system according to the first configuration setting;
boot a second computing node of the computing system according to the second configurations setting, wherein the first computing node and the second computing node are connected via a network;
load the first computing task into the first computing node for execution;
load the second computing task into the second computing node for execution;
after the first computing task finishes on the first computing node, determine whether another computing task associated with the first configuration setting has not been executed;
when it is determined that a third computing task associated with the first configuration setting has not been executed, loading the third computing task into the first computing node for execution;
when there is no computing task associated with the first configuration setting remaining unexecuted, reboot the first computing node according to a third configuration setting different from the first configuration setting; and
load a fourth computing task of the plurality of computing tasks associated with the third configuration setting into the first computing node for execution.

10. The computing system of claim 9, wherein to determine the first configuration setting and the second configuration setting comprises test executing a portion of the first computing task and a portion of the second computing task using different configuration settings to determine the first configuration setting and the second configuration setting based on performance under the different configuration settings.

11. The computing system of claim 9, wherein to determine the first configuration setting and the second configuration setting comprises executing, by simulation, a portion of the first computing task and a portion of the second computing task using different configuration settings to determine the first configuration setting and the second configuration setting based on performance under the different configuration settings.

12. The computing system of claim 9, wherein each of the first configuration setting and the second configuration settings includes one or more low level hardware settings that require a central processing unit (CPU) reboot to take effect.

13. The computing system of claim 12, wherein the one or more low level hardware settings include CPU settings and memory settings,
wherein the CPU settings include one or more of CPU halt states, CPU hyper threading, core multiprocessing, cache pre-fetchers, performance boost, dynamic frequency scaling, Data Direct I/O and Direct Cache Access, and power control, and wherein the memory settings include one or more of low voltage mode of Double Data Rate (DDR) memory, and Isochronous mode.

14. The computing system of claim 9, wherein the processor is further configured to:
   boot a first subset of a plurality of computing nodes of the computing system including the first computing node according to the first configuration setting,
   load the first computing task into the first subset of computing nodes for execution;
   boot a second subset of the plurality of computing nodes including the second computing node according to the second configuration setting, and
   load the second computing task into the second subset of computing nodes for execution.

15. A non-transitory computer readable storage media encoded with instructions that, when executed by a processor of a computing device of a computing system, cause the processor to:
   receive a plurality of computing tasks for execution by a computing system;
   determine a first configuration setting for a first computing task of a plurality of computing tasks and a second configuration setting for a second computing task of the plurality of computing tasks, wherein the first configuration setting differs from the second configuration setting;
   boot a first computing node of the computing system according to the first configuration setting;
   boot a second computing node of the computing system according to the second configurations setting, wherein the first computing node and the second computing nodes are connected via a network;
   load the first computing task into the first computing node for execution;
   load the second computing task into the second computing node for execution;
   after the first computing task finishes on the first computing node, determine whether another computing task associated with the first configuration setting has not been executed;
   when it is determined that a third computing task associated with the first configuration setting has not been executed, loading the third computing task into the first computing node for execution;
   when there is no computing task associated with the first configuration setting remaining unexecuted, reboot the first computing node according to a third configuration setting different from the first configuration setting; and
   load a fourth computing task of the plurality of computing tasks associated with the third configuration setting into the first computing node for execution.

16. The non-transitory computer readable storage media of claim 15, wherein to determine the first configuration setting and the second configuration setting comprises test executing a portion of the first computing task and a portion of the second computing task using different configuration settings to determine the first configuration setting and the second configuration setting based on performance under the different configuration settings.

17. The non-transitory computer readable storage media of claim 15, wherein each of the first configuration setting and the second configuration settings includes one or more low level hardware settings that require a central processing unit (CPU) reboot to take effect.

18. The non-transitory computer readable storage media of claim 17, wherein the one or more low level hardware settings include CPU settings and memory settings,
   wherein the CPU settings include one or more of CPU halt states, CPU hyper threading, core multiprocessing, cache pre-fetchers, performance boost, dynamic frequency scaling, Data Direct I/O and Direct Cache Access, and power control, and
   wherein the memory settings include one or more of low voltage mode of Double Data Rate (DDR) memory, and Isochronous mode.

19. The non-transitory computer readable storage media of claim 15, wherein the processor is further configured to:
   boot a first subset of a plurality of computing nodes of the computing system including the first computing node according to the first configuration setting,
   load the first computing task into the first subset of computing nodes for execution;
   boot a second subset of the plurality of computing nodes including the second computing node according to the second configuration setting, and
   load the second computing task into the second subset of computing nodes for execution.

20. The non-transitory computer readable storage media of claim 15, wherein to determine the first configuration setting and the second configuration setting comprises executing, by simulation, a portion of the first computing task and a portion of the second computing task using different configuration settings to determine the first configuration setting and the second configuration setting based on performance under the different configuration settings.

* * * * *